Patented Nov. 29, 1932

1,889,437

UNITED STATES PATENT OFFICE

ALLERT JOHAN DE LANGE, OF AMSTERDAM, NETHERLANDS, ASSIGNOR, BY MESNE ASSIGNMENTS, TO THE FLINTKOTE CORPORATION, OF BOSTON, MASSACHUSETTS, A CORPORATION OF MASSACHUSETTS

PROCESS FOR THE MANUFACTURE OF A BITUMINOUS CEMENT MORTAR, CEMENT CONCRETE AND THE LIKE

No Drawing. Application filed November 15, 1929, Serial No. 407,575, and in the Netherlands November 17, 1928.

My invention relates to a process for the manufacture of a bituminous cement mortar, cement concrete and the like and to products made therefrom, like tiles, floorings, wall-coverings, roads and the like.

It has been found that if a bituminous dispersion is added to a cement mortar or similar masses which harden with water the product made from this mass, though being water-tight and elastic, is less resistant to pressure than are similar products made in the same way but without a bituminous dispersion.

Now the process according to my invention makes it possible to manufacture such products with the aid of aqueous dispersions of asphalt, paraffin, tar, pitch, oil and the like, which products meet high requirements also in respect to their resistance against pressure.

I have found that the properties of the product made from cement mortars and bituminous dispersions are governed not only by the nature of the ingredients but also by the stage at which and the manner in which the various components are added.

This applies in the first place to bituminous dispersions but also to combinations of bituminous dispersions and any chemicals, such as water-glass, sodium hydroxide, potassium hydroxide, calcium chloride, aluminium chloride and the like, which are sometimes used in the preparation of cement masses.

The process according to my invention consists in water, if necessary mixed with chemicals, such as calcium chloride, aluminium chloride, sodium or potassium silicate, sodium or potassium hydroxide and the like, being added to the mortar, preferably in such a quantity as is not sufficient to cause absolute hardening of the mortar, and after this, while the mixture is partly bound, a quantity of a bituminous dispersion being added.

Good results are also obtained by my invention when the said chemicals are mixed into the mass after the addition of the asphalt or paraffin emulsion.

The process according to my invention will be further explained below by the following examples, but it should be understood that it is by no means restricted thereto. The terms "parts by volume" and "parts by weight" in the following examples are intended to be synonymous with "litres" and "kilograms" respectively.

I.—400 parts by volume of a fine mineral (sand and such-like) and 150 parts by weight of cement are mixed with 20 parts by volume of water in a mixing machine. After some time, for instance 10 minutes, 10 parts by volume of an asphalt emulsion of about 50% strength are added.

The mass is then placed in a press and preferably subjected to high pressures. The tiles are subsequently dried at an elevated temperature, after which they have to undergo for some time a so-called secondary hardening at ordinary temperature.

II.—A mixture of 300 parts by volume of sand and 100 parts by weight of cement is mixed with 20 parts by volume of water. To the paste thus obtained 20 parts of an asphalt dispersion are added. The resulting mixture may be poured and is suitable for the manufacture of floorings, roads and the like.

III.—400 parts by volume of a fine mineral, 150 kilos cement and 10 parts by volume of water are mixed, after which 10 parts by volume of a 5.5% sodium water-glass solution are added. After some time, when the mixture is partly bound, 12 parts by volume of an asphalt emulsion of about 50% strength are added.

The tiles can also be made in two layers. The components of the bottom layer and of the top layer are then mixed separately in exactly the same manner as shown in the examples. It is also possible in that case to work in the bituminous dispersion in the top layer only.

Further, variously coloured asphalt dispersions may be used in the manufacture of artificial stone. In cases where tiles and the like are made in two layers it may be sufficient to use the coloured asphalt dispersion only in the top layer, while the bottom layer can then be made with or without a non-coloured bituminous dispersion.

It has further been found that addition of a small quantity of a bituminous dispersion and subsequent formation of the desired objects under high pressure yields products which do not show a decrease in resistance to pressure, to binding and to shock, whereas the elasticity of the material is considerably increased.

IV.—400 litres of a mineral, consisting of coarse and fine broken stone, if desired mixed with sand, are mixed in dry condition with 150 kilograms of cement. The mixture is then mixed with 40 litres of water and 8 litres of a bituminous dispersion. Tiles are pressed from this matrix, using high pressures in the press.

Though my invention is by no means restricted to the use of a certain bituminous dispersion, it is advantageous to use aqueous dispersions of bitumen which contain clay or bentonite as an emulsifier or stabilizer and also bituminous dispersions the dispersed particles of which have a positive charge.

I claim as my invention:

1. A process for the manufacture of bituminous cement motar, consisting in mixing water with the dry constituents of the motar and after the mixture is partly bound, adding a predetermined quantity of asphalt dispersed in an aqueous medium.

2. A process for the manufacture of bituminous cement mortar, consisting in mixing with the dry constituents of the mortar, water insufficient in amount to cause absolute hardness of the mortar, and after the mixture is partly bound, adding a predetermined quantity of asphalt dispersed in an aqueous medium.

3. A process for the manufacture of bituminous cement motar, consisting in mixing with the dry constituents of the cement, water together with a chemical of the class consisting of calcium chloride, aluminum chloride, sodium silicate, potassium silicate, sodium hydroxide and potassium hydroxide, and after the mixture is partly bound, adding a predetermined quantity of asphalt dispersed in an aqueous medium.

4. A process for the manufacture of bituminous cement motar, consisting in mixing with the dry constituents of the motar, water insufficient in amount to cause absolute hardness together with a chemical of the class consisting of calcium chloride, aluminum chloride, sodium and potassium silicate and sodium and potassium hydroxide, and after the mixture is partly bound, adding a predetermined quantity of asphalt dispersed in an aqueous medium.

Signed at Amsterdam in the county of North Holland and State of The Netherlands this 5th day of November, A. D. 1929.

ALLERT JOHAN de LANGE.